United States Patent
Sasada

(10) Patent No.: US 6,978,135 B2
(45) Date of Patent: Dec. 20, 2005

(54) LOCATION REGISTER, LOCATION REGISTRATION SYSTEM, AND LOCATION REGISTRATION METHOD

(75) Inventor: Koji Sasada, Kamakura (JP)

(73) Assignee: NTT DoCoMo, Inc., Tokyo (JP)

(*) Notice: Subject to any disclaimer, the term of this patent is extended or adjusted under 35 U.S.C. 154(b) by 366 days.

(21) Appl. No.: 10/041,748

(22) Filed: Jan. 10, 2002

(65) Prior Publication Data
US 2002/0090945 A1 Jul. 11, 2002

(30) Foreign Application Priority Data
Jan. 11, 2001 (JP) ............................. 2001-004074

(51) Int. Cl.[7] .............................................. H04Q 7/20
(52) U.S. Cl. ........................ 455/435.1; 455/432.1; 455/432.3; 455/435.2; 455/456.1
(58) Field of Search .................. 455/435.1, 432.3, 455/433, 456.1, 456.2, 432.1, 435.2, 414.1, 455/456.3, 422.1, 414.2

(56) References Cited

U.S. PATENT DOCUMENTS

| | | | | |
|---|---|---|---|---|
| 6,061,564 A | * | 5/2000 | Akeda | 455/435.1 |
| 6,119,012 A | * | 9/2000 | Amirijoo | 455/456.1 |
| 6,272,344 B1 | * | 8/2001 | Kojima | 455/435.1 |
| 6,330,446 B1 | * | 12/2001 | Mori | 455/435.2 |
| 6,363,255 B1 | * | 3/2002 | Kuwahara | 455/456.5 |
| 6,466,785 B1 | * | 10/2002 | Chambert et al. | 455/422.1 |
| 6,466,787 B1 | * | 10/2002 | Cannon et al. | 455/434 |
| 6,510,318 B1 | * | 1/2003 | Minagawa | 455/435.2 |
| 6,549,775 B2 | * | 4/2003 | Ushiki et al. | 455/432.1 |
| 6,603,763 B1 | * | 8/2003 | Koshino | 370/389 |
| 6,675,014 B1 | * | 1/2004 | Sundquist | 455/435.1 |
| 6,714,636 B1 | * | 3/2004 | Baiyor et al. | 379/211.04 |
| 6,807,427 B1 | * | 10/2004 | Sakamoto et al. | 455/456.1 |
| 2002/0072369 A1 | * | 6/2002 | Sasada et al. | 455/435 |
| 2003/0013444 A1 | * | 1/2003 | Watanabe et al. | 455/435 |
| 2003/0190914 A1 | * | 10/2003 | Shimbori | 455/435.1 |

FOREIGN PATENT DOCUMENTS

| | | | |
|---|---|---|---|
| EP | 0 541 026 | 5/1993 | |
| EP | 0541026 A2 * | 5/1993 | ............ H04Q 7/26 |
| JP | 05-056472 | 3/1993 | |
| JP | 11-298945 | 10/1999 | |
| JP | 2000232673 * | 8/2000 | ............ H04Q 7/34 |
| JP | 2000-308117 | 11/2000 | |
| KR | 2000-0007999 | 2/2000 | |
| WO | WO 00/30395 | 5/2000 | |
| WO | WO0128269 A2 * | 4/2001 | ............ H04Q 7/38 |
| WO | WO 02/03719 | 1/2002 | |

* cited by examiner

Primary Examiner—Charles Appiah
Assistant Examiner—Khawar Iqbal
(74) Attorney, Agent, or Firm—Oblon, Spivak, McClelland, Maier & Neustadt, P.C.

(57) ABSTRACT

A location registration system 10 comprises a mobile communication terminal 12 and a location register 14 for carrying out location registration of the mobile communication terminal 12. The location register 14 comprises a storage section 16 for storing the number of stays of the mobile communication terminal 12; a location registration period determination section 18 for determining a period of location registration of the mobile communication terminal 12 according to the number of stays of the mobile communication terminal 12 stored in the storage section 16; and a location registration control section 20 for transmitting the period of location registration determined by the location registration period determination section 18 to the mobile communication terminal 12, receiving location information of the mobile communication terminal 12 transmitted therefrom in response to the transmitted period of location registration, and carrying out location registration of the mobile communication terminal 12 according to the received location information.

22 Claims, 15 Drawing Sheets

Fig.2

| MOBILE COMMUNICATION TERMINAL | LOCATION INFORMATION | NUMBER OF STAYS | |
|---|---|---|---|
| MOBILE COMMUNICATION TERMINAL1 | LOCATION REGISTRATION AREA1 | 1 | |
| MOBILE COMMUNICATION TERMINAL2 | LOCATION REGISTRATION AREA2 | 11 | ~16a |
| MOBILE COMMUNICATION TERMINAL3 | LOCATION REGISTRATION AREA1 | 0 | |
| | | | |

Fig.4

| MOBILE COMMUNICATION TERMINAL | LOCATION INFORMATION | FREQUENCY OF INCOMING CALL |
|---|---|---|
| MOBILE COMMUNICATION TERMINAL1 | LOCATION REGISTRATION AREA1 | 1 |
| MOBILE COMMUNICATION TERMINAL2 | LOCATION REGISTRATION AREA2 | 4 |
| MOBILE COMMUNICATION TERMINAL3 | LOCATION REGISTRATION AREA1 | 5 |
| | | |

| MOBILE COMMUNICATION TERMINAL | LOCATION INFORMATION | NUMBER OF STAYS | LAST UPDATE TIME | LOCATION REGISTRATION ADMINISTRATION PERIOD |
|---|---|---|---|---|
| MOBILE COMMUNICATION TERMINAL1 | LOCATION REGISTRATION AREA1 | 1 | 11:22:23 | 70min |
| MOBILE COMMUNICATION TERMINAL2 | LOCATION REGISTRATION AREA2 | 11 | 11:30:00 | 130min |
| MOBILE COMMUNICATION TERMINAL3 | LOCATION REGISTRATION AREA1 | 0 | 11:45:00 | 70min |

| MOBILE COMMUNICATION TERMINAL | LOCATION INFORMATION | NUMBER OF STAYS |
|---|---|---|
| MOBILE COMMUNICATION TERMINAL1 | LOCATION REGISTRATION AREA1 | 1 |
| MOBILE COMMUNICATION TERMINAL2 | LOCATION REGISTRATION AREA2 | 11 |
| MOBILE COMMUNICATION TERMINAL3 | VACANT | — |
| | | |

| MOBILE COMMUNICATION TERMINAL | VISITED VLR |
|---|---|
| MOBILE COMMUNICATION TERMINAL1 | VLR1 |
| MOBILE COMMUNICATION TERMINAL2 | VLR1 |
| MOBILE COMMUNICATION TERMINAL3 | VLR2 |
| | |

| MOBILE COMMUNICATION TERMINAL | LOCATION INFORMATION | FREQUENCY OF INCOMING CALL |
|---|---|---|
| MOBILE COMMUNICATION TERMINAL1 | LOCATION REGISTRATION AREA1 | 1 |
| MOBILE COMMUNICATION TERMINAL2 | LOCATION REGISTRATION AREA2 | 4 |
| MOBILE COMMUNICATION TERMINAL3 | VACANT | — |
| | | |

| MOBILE COMMUNICATION TERMINAL | VISITED VLR | FREQUENCY OF INCOMING CALL |
|---|---|---|
| MOBILE COMMUNICATION TERMINAL1 | VLR1 | 1 |
| MOBILE COMMUNICATION TERMINAL2 | VLR1 | 4 |
| MOBILE COMMUNICATION TERMINAL3 | VLR2 | 5 |
| | | |

~44b

LOCATION REGISTER, LOCATION REGISTRATION SYSTEM, AND LOCATION REGISTRATION METHOD

BACKGROUND OF THE INVENTION

1. Field of the Invention

The present invention relates to a location register, a location registration system, and a location registration method which carry out location registration of mobile communication terminals.

2. Related Background Art

In order for mobile communication terminals such as cellular phones to efficiently receive incoming calls, it is necessary to successively grasp where moving mobile communication terminals are located at present. For successively grasping a position where a mobile communication terminal exists (location registration area), a location registration process is carried out. The location registration process comprises the steps of transmitting location information of the mobile communication terminal to a location register from the mobile communication terminal when it enters a different location registration area upon movement thereof, and registering the location information into the location register. This location registration is carried out periodically (e.g., at a period of 60 minutes) in order to inform the location register of the fact that the power of the mobile communication terminal is not turned off and that the mobile communication terminal does not move out of a communication zone even when the mobile communication terminal remains within the same location registration area.

SUMMARY OF THE INVENTION

In the conventional location registration method mentioned above, the transmission and reception of information between the mobile communication terminal and the location register, such as the transmission of location information from the mobile communication terminal to the location register and the transmission of location registration response signals from the location register to the mobile communication terminal, are performed at a predetermined period upon the periodic location registration mentioned above. Therefore, traffic continuously occurs in a data transmission line between the mobile communication terminal and the location register. Also, due to the rapid popularization of cellular phones in these days, the traffic in data transmission lines between mobile communication terminals and location registers caused by location registration has been increasing. An excessive increase in such traffic may cause troubles such as communication faults.

Here, the period of location registration may uniformly be made longer so as to reduce the traffic in data transmission lines between mobile communication terminals and location registers caused by location registration. If the period of location registration is uniformly made longer, however, the possibility (time zone) of a location register failing to grasp the fact that a mobile communication terminal moves out of a communication area (or its power is turned off) even when the mobile communication terminal moves out of the communication area (or its power is turned off) will increase. As a result, the frequency at which the location register carries out invalid incoming call processing for the mobile communication terminal increases, thereby enhancing ineffective incoming traffic.

Therefore, it is an object of the present invention to provide a location registration method and a location registration system which can reduce the traffic between a mobile communication terminal and a location register, and a location register used therefor.

For overcoming the above-mentioned problem, the location register of the present invention is a location register for carrying out location registration of a mobile communication terminal, the location register comprising first storage means for storing information concerning a movement status of the mobile communication terminal; first determination means for determining a period of location registration of the mobile communication terminal according to the information concerning the movement status of the mobile communication terminal stored in the first storage means; and first registration means for transmitting the period of location registration determined by the first determination means to the mobile communication terminal, receiving location information transmitted from the mobile communication terminal in response to the transmitted period of location registration, and carrying out location registration of the mobile communication terminal according to the received location information.

For mobile communication terminals mainly used within a limited area (e.g., a mobile communication terminal arranged in a vending machine or the like), the necessity for carrying out location registration at a period identical to that for mobile communication terminals moving over a wide area is scarce. When a period of location registration is determined according to the movement status of a mobile communication terminal, and the location registration of the mobile communication terminal is carried out in response to this period, the period of location registration can be made longer for a mobile communication terminal which is mainly used within a limited area so that the necessity for frequently carrying out its location registration is scarce. As a result, traffic can be reduced in data transmission lines between mobile communication terminals and location registers.

Also, for overcoming the above-mentioned problem, the location register of the present invention may be a location register for carrying out location registration of a mobile communication terminal, the location register comprising second storage means for storing information concerning a frequency of incoming call to the mobile communication terminal; second determination means for determining a period of location registration of the mobile communication terminal according to the information concerning the frequency of incoming call to the mobile communication terminal stored in the second storage means; and second registration means for transmitting the period of location registration determined by the second determination means to the mobile communication terminal, receiving location information transmitted from the mobile communication terminal in response to the transmitted period of location registration, and carrying out location registration of the mobile communication terminal according to the received location information.

For mobile communication terminals which are mainly used for originating calls and hardly receive calls, the necessity for carrying out location registration at a period identical to that for mobile communication terminals mainly used for receiving calls is scarce. When a period of location registration is determined according to information concerning the frequency of incoming call to a mobile communication terminal, and the location registration of the mobile communication terminal is carried out according to this period, the period of location registration can be made longer for a mobile communication terminal which is mainly used for originating calls so that the necessity for frequently carrying out its location registration is scarce. As a result, traffic can be reduced in data transmission lines between mobile communication terminals and location registers.

The location registration system, and location registration method of the present invention have common technical idea as the location registers mentioned above.

BRIEF DESCRIPTION OF THE DRAWINGS

FIG. 2 is a chart of a location information administration table.

FIG. 4 is a chart of a location information administration table.

FIG. 7 is a chart of a location information administration table.

FIG. 9 is a chart of a VLR location information administration table.

FIG. 10 is a chart of an HLR location information administration table.

FIG. 12 is a chart of a VLR location information administration table.

FIG. 13 is a chart of an HLR location information administration table.

DESCRIPTION OF THE PREFERRED EMBODIMENTS

A location registration system in accordance with a first embodiment of the present invention will be explained with reference to drawings. The location registration system in accordance with this embodiment includes a location register in accordance with an embodiment of the present invention.

Figure 1:
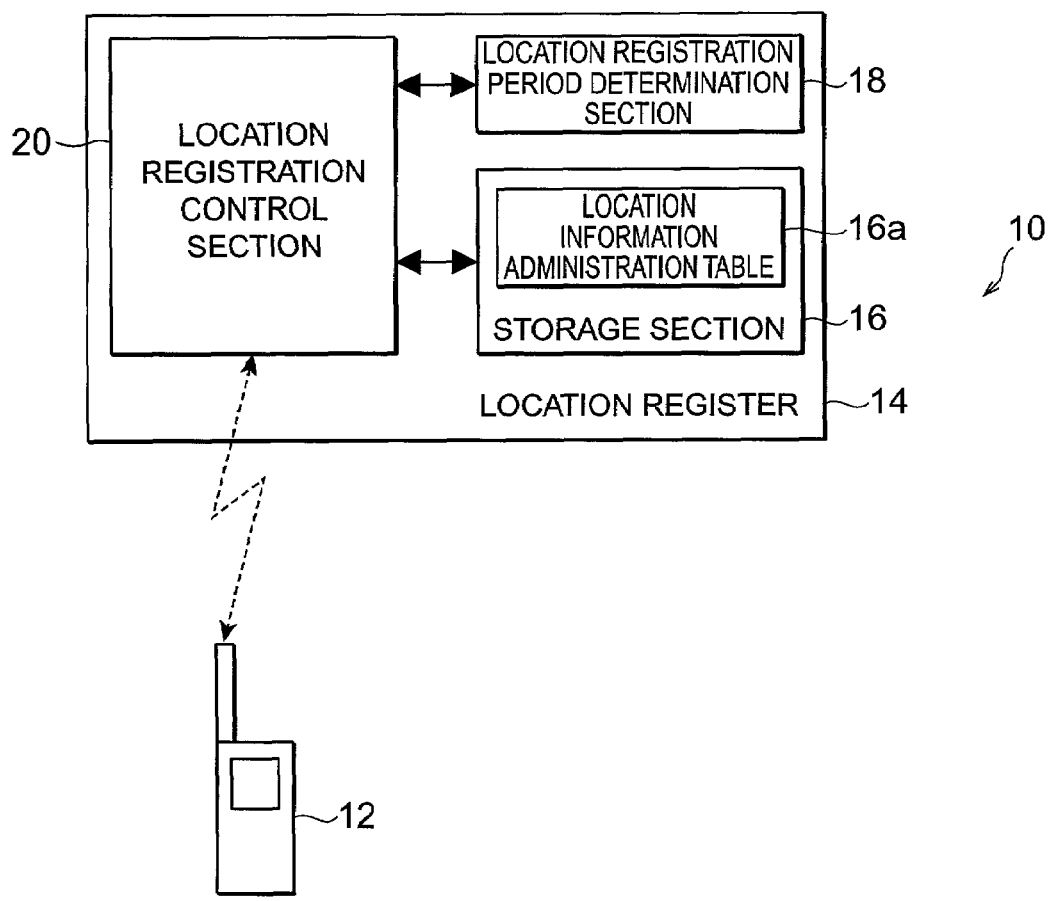
FIG. 1 is a diagram of a location registration system.

First, the configuration of the location registration system in accordance with this embodiment will be explained. FIG. 1 is a diagram showing the location registration system in accordance with this embodiment. As shown in FIG. 1, the location registration system 10 in accordance with this embodiment comprises a mobile communication terminal 12 constituted by a cellular phone or the like, and a location register 14 for carrying out location registration of the mobile communication terminal 12. The location register 14 comprises a storage section 16, a location registration period determination section 18, and a location registration control section 20. Each constituent will be explained in detail in the following.

The storage section 16 stores a location information administration table 16a. FIG. 2 is a chart showing the location information administration table 16a. As shown in FIG. 2, the location information administration table 16a includes respective IDs of a plurality of mobile communication terminals 12 administered by the location register 14, respective location information items of the plurality of mobile communication terminals 12, and respective numbers of stays (information items concerning the movement status) of the plurality of mobile communication terminals 12. Here, for example, the number of location registration area where the mobile communication terminals 12 exist and the like is one of the location information of mobile communication terminals 12, and the information is updated each time the location information is received by the location registration control section 20. The number of stays is information indicative of how long the mobile communication terminals 12 stay in the same location registration area. For example, the number of predetermined periods for updating the information during which the mobile communication terminals 12 stay in the same location registration area falls within this information.

The location registration period determination section 18 determines a period of location registration of a mobile communication terminal 12 according to the number of stays of the mobile communication terminal 12 stored in the location information administration table 16a of the storage section 16. More specifically, for example, when a particular mobile communication terminal 12 stays in the same location registration area by at least a predetermined number of times (e.g., 10) in the case where the location registration of mobile communication terminals 12 is carried out by the location registration control section 20 at a predetermined period (e.g., 60 minutes), the period of location registration for this particular mobile communication terminal 12 is changed to a period (e.g., 120 minutes) longer than the predetermined period.

The location registration control section 20 transmits the period of location registration determined by the location registration period determination section 18 to the abovementioned particular mobile communication terminal 12, receives the location information of the mobile communication terminal 12 transmitted therefrom in response to the transmitted period of location registration, and carries out location registration of the mobile communication terminal 12 according to the received location information. Namely, when registering respective locations of a plurality of mobile communication terminals 12, the location registration control section 20 carries out location registration at different periods corresponding to the respective numbers of stays of the plurality of mobile communication terminals 12.

Figure 3:
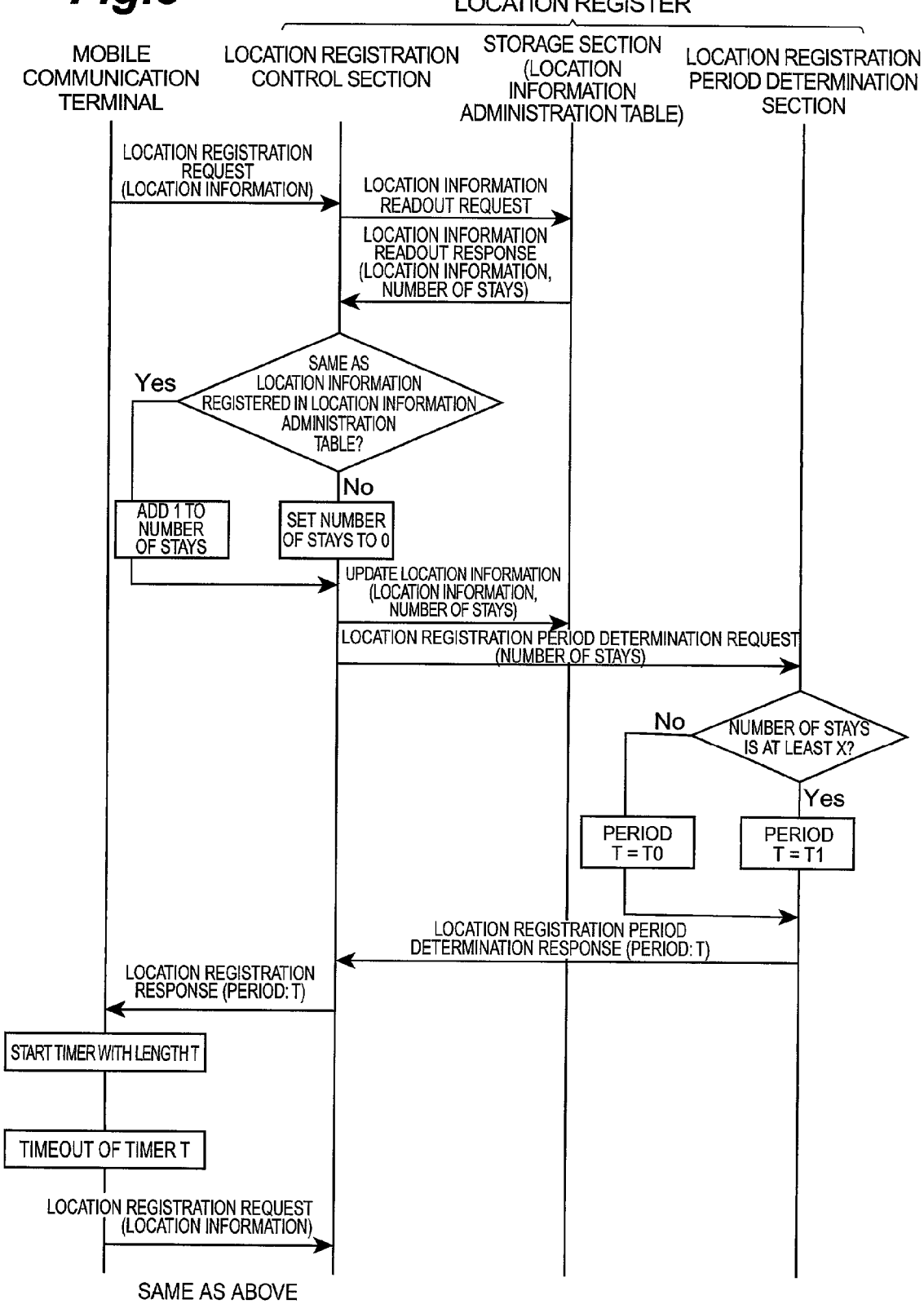
FIG. 3 is a chart showing a procedure of location registration in the location registration system.

Operations of the location registration system in accordance with this embodiment will now be explained together with a method of location registration in accordance with an embodiment of the present invention. FIG. 3 is a chart showing the procedure for carrying out location registration of a mobile communication terminal 12 in the location registration system 10 in accordance with this embodiment.

When registering a location of the mobile communication terminal 12 in the location registration system 10 in accordance with this embodiment, the mobile communication terminal 12 initially transmits a location registration request to the location register 14. Such a location registration request includes location information (location registration area) indicative of the location at which the mobile communication terminal 12 exists at present. The location registration request transmitted from the mobile communication terminal 12 is received by the location registration control section 20 of the location register 14.

When the location registration request is received by the location registration control section 20, a location information readout request for reading out the location information and number of stays of the mobile communication terminal 12 is outputted from the location registration control section 20 to the storage section 16.

When such a location information readout request is outputted to the storage section 16, a location information readout response is outputted from the storage section 16 to the location registration control section 20. Here, the location information readout response includes the location information (i.e., the location information at the time of previous location registration) and number of stays of the mobile communication terminal 12 read out from the location information administration table 16a.

If the location information received from the mobile communication terminal 12 and the location information contained in the location information administration table 16a are identical to each other here, i.e., the location registration area where the mobile communication terminal 12 exists at this time of location registration is identical to that at the time of the previous location registration, the location registration control section 20 adds 1 to the number of stays of the mobile communication terminal 12. If the location information received from the mobile communication terminal 12 and the location information contained in the location information administration table 16a are different from each other here, i.e., the location registration area where the mobile communication terminal 12 exists at this time of location registration differs from that at the time of the previous location registration, by contrast, then the location registration control section 20 resets the number of stays of the mobile communication terminal 12 to zero.

When the number of stays is calculated by the location registration control section 20 (1 is added thereto or the number is reset to zero), thus calculated number of stays is stored into the location information administration table 16a of the storage section 16, and the location information of the location information administration table 16a in the storage section 16 is updated to the location information received from the mobile communication terminal 12. When the location information received from the mobile communication terminal 12 and the location information contained in the location information administration table 16a are identical to each other, it will be sufficient if only the number of stays is stored into the location information administration table 16a without updating the location information.

When the number of stays of the mobile communication terminal 12 is calculated by the location registration control section 20, the latter outputs a location registration period determination request to the location registration period determination section 18. Here, the location registration determination request includes the number of stays of the mobile communication terminal 12 calculated by the location registration control section 20.

When the location registration period determination request is outputted from the location registration control section 20, the location registration period determination section 18 determines a location registration period of the mobile communication terminal 12. More specifically, if the number of stays of the mobile communication terminal 12 is less than a predetermined number (e.g., 10), i.e., the mobile communication terminal 12 does not stay in the same location registration area for at least a predetermined time, then the location registration period of the mobile communication terminal 12 is determined to be a normal location registration period (e.g., 60 minutes). If the number of stays of the mobile communication terminal 12 is at least a predetermined number (e.g., 10), i.e., the mobile communication terminal 12 stays in the same location registration area for at least a predetermined time, by contrast, then the location registration period of the mobile communication terminal 12 is determined to be a predetermined period (e.g., 120 minutes) longer than the above-mentioned normal location registration period.

When a location registration period of the mobile communication terminal 12 is determined by the registration period determination section 18, this location registration period is outputted from the location registration determination section 18 to the location registration control section 20 as a location registration period determination response. Also, the location registration period is transmitted from the location registration control section 20 to the mobile communication terminal 12 as a location registration response.

When the mobile communication terminal 12 receives the location registration response including the location registration period, a timer for the location registration period is started by the mobile communication terminal 12, a location registration request is transmitted from the mobile communication terminal 12 to the location register 14 upon a timeout of the timer, and these operations are repeated thereafter.

Operations and effects of the location registration system in accordance with this embodiment will now be explained. In the location registration system 10 in accordance with this embodiment, the location registration period determination section 18 determines a period of location registration of a mobile communication terminal 12 according to the number of stays of the mobile communication terminal 12, which is a scale for the time during which the mobile communication terminal 12 exists in the same location registration area, and the location registration control section 20 carries out location registration of the mobile communication terminal 12 in response to this period. Therefore, the period of location registration can be made longer for mobile communication terminals 12 which are mainly used within a limited are a so that the necessity for frequently carrying out their location registration is scarce. As a result, the traffic between data transmission lines between mobile communication terminals 12 and location registers 14 can be reduced.

A first modified example of the location registration system 10 in accordance with this embodiment will now be explained. In the location registration system 10 in accordance with this embodiment, the number of stays of the mobile communication terminal 12 is stored in the location registration administration table 16a of the storage section 16, the location registration period determination section 18 determines a period of location registration of the mobile communication terminal 12 according to the number of stays, and the location registration control section 20 carries out location registration of the mobile communication terminal 12 in response to the location registration period determined according to the number of stays as mentioned above. However, it maybe configured as shown in FIG. 4 such that a location information administration table 16b including the frequency of incoming call to the mobile communication terminal 12 is stored in the storage section 16, the location registration period determination section 18 determines a period of location registration of the mobile communication terminal 12 according to the frequency of incoming call to the mobile communication terminal 12, and the location registration control section 20 carries out location registration of the mobile communication terminal 12 in response to the location registration period determined according to the frequency of incoming call as mentioned above.

Figure 5:
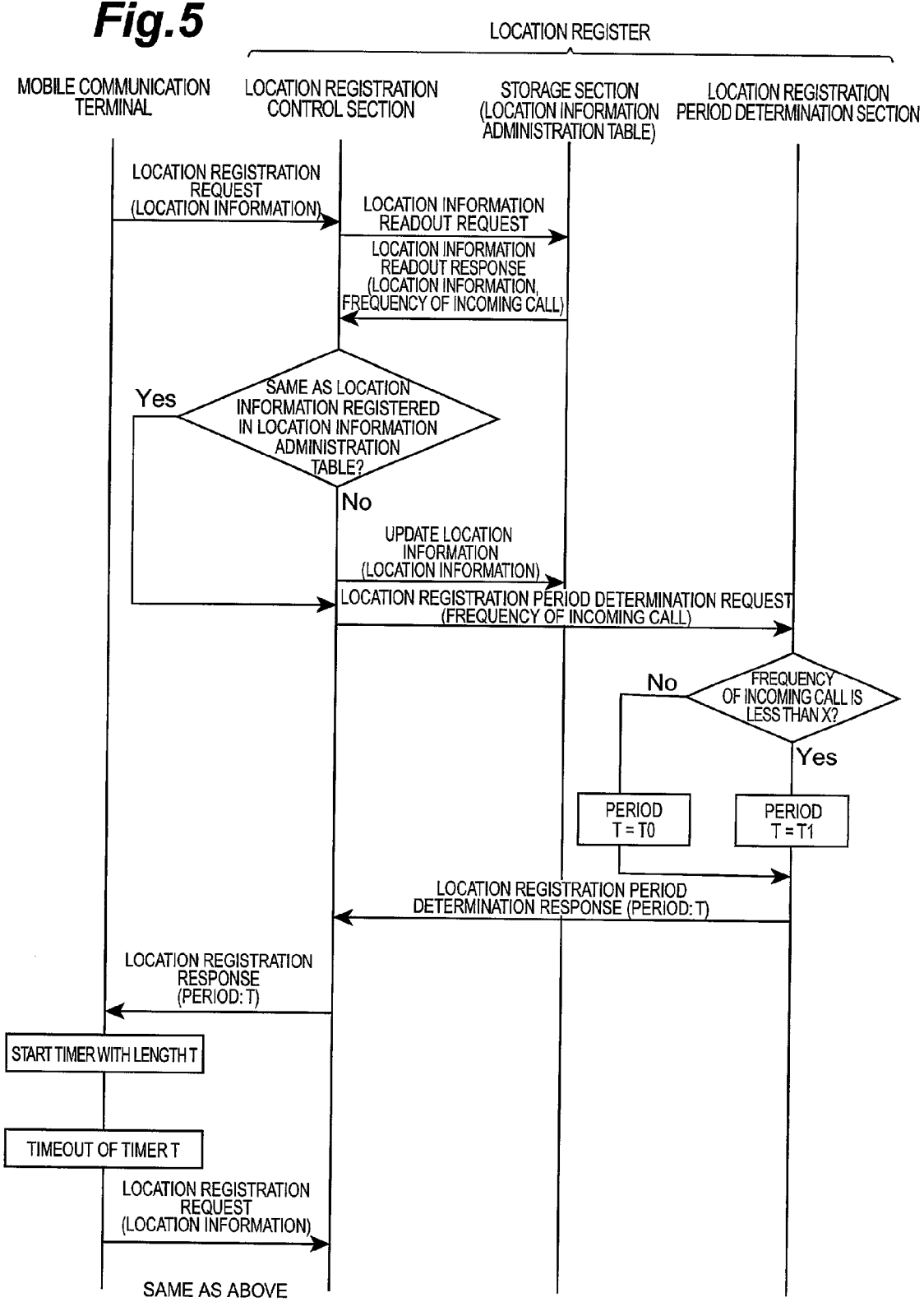
FIG. 5 is a chart showing a procedure of location registration in the location registration system.

FIG. 5 is a chart showing the procedure for carrying out location registration of a mobile communication terminal 12 in this modified example. When the mobile communication terminal 12 transmits a location registration request to the location registration control section 20 of the location register 14, and the location registration control section 20 outputs a location information readout request to the storage section 16, location information of the mobile communication terminal 12 (i.e., the location information at the time of previous location registration) and the frequency of incoming call to the mobile communication terminal 12 are read out from the location information administration table 16b stored in the storage section 16, and are outputted to the location registration control section 20 as a location information readout response.

If the location information received from the mobile communication terminal 12 and the location information contained in the location information administration table 16b are different from each other here, i.e., the location registration area where the mobile communication terminal 12 exists at this time of location registration differs from that at the time of the previous location registration, the location information of the location information administration table 16b in the storage section 16 is updated to the location information received from the mobile communication terminal 12. If the location information received from the mobile communication terminal 12 and the location information contained in the location information administration table 16b are identical to each other here, i.e., the location registration area where the mobile communication terminal 12 exists at this time of location registration is identical to that at the time of the previous location registration, by contrast, then the location information of the location information administration table 16b of the storage section 16 is not updated.

When the location information readout response is received by the location registration control section 20, the latter outputs a location registration period determination request to the location registration period determination section 18. Here, the location registration period determination request includes the frequency of incoming call to the mobile communication terminal 12 contained in the location information readout response.

When the location registration period determination request is outputted from the location registration control section 20, the location registration period determination section 18 determines a location registration period of the mobile communication terminal 12. More specifically, if the frequency of incoming call to the mobile communication terminal 12 is at least a predetermined number (e.g., 2 times/hour), then the location registration period of the mobile communication terminal is determined to be a normal location registration period (e.g., 60 minutes). If the frequency of incoming call to the mobile communication terminal 12 is less than a predetermined number (e.g., 2 times/hour), then the location registration period of the mobile communication terminal 12 is determined to be a predetermined period (e.g., 120 minutes) longer than the normal location registration period.

When a location registration period of the mobile communication terminal 12 is determined by registration period determination section 18, this location registration period is outputted from the location registration determination section 18 to the location registration control section 20 as being included in a location registration period determination response and is transmitted to the mobile communication terminal 12 as being included in a location registration response.

When the mobile communication terminal 12 receives the location registration response including the location registration period, a timer for the location registration period is started by the mobile communication terminal 12, a location registration request is transmitted from the mobile communication terminal 12 to the location register 14 upon a timeout of the timer, and these operations are repeated thereafter.

When the location registration determination section 18 determines a period of location registration according to information concerning the frequency of incoming call to a mobile communication terminal 12, and the location registration control section 20 carries out location registration of the mobile communication terminal 12 in response to this period as in this modified example, the period of location registration can be made longer for mobile communication terminals 12 which are mainly used for originating calls so that the necessity for frequently carrying out their location registration is scarce. As a result, the traffic in data transmission lines between mobile communication terminals 12 and location registers 14 can be reduced.

In the location information administration system 10 in accordance with the above-mentioned embodiment and the above-mentioned modified example, the location registration period determination section 18 determines a period of location registration of a mobile communication terminal 12 according to the number of stays of the mobile communication terminal 12 or the frequency of incoming call to the mobile communication terminal 12, and the location registration control section 20 carries out location registration of the mobile communication terminal 12 in response to the location registration period determined according to the number of stays of the mobile communication terminal 12 or the frequency of incoming call to the mobile communication terminal 12. However, it may be configured such that the location registration period determination section 18 determines a period of location registration of the mobile communication terminal 12 according to both of the number of stays of the mobile communication terminal 12 and the frequency of incoming call to the mobile communication terminal 12, and the location registration control section 20 carries out location registration of the mobile communication terminal 12 in response to the location registration period determined according to both of the number of stays of the mobile communication terminal 12 and the frequency of incoming call to the mobile communication terminal 12.

When a period of location registration is determined according to both of the number of stays of the mobile communication terminal 12 and the frequency of incoming call to the mobile communication terminal 12, and location registration of the mobile communication terminal 12 is carried out according to this location registration period, the location registration can be carried out for each of a plurality of mobile communication terminals 12 at a period which is quite suitable from both of the viewpoints of reducing the traffic at location registration and lowering invalid incoming traffic as compared with cases where the period of location registration is determined according to the number of stays of the mobile communication terminal 12 alone, where the period of location registration is determined according to the frequency of incoming call to the mobile communication terminal 12 alone, and the like. As a result, the traffic in data transmission lines between mobile communication terminals 12 and location registers 14 can efficiently be reduced.

A second modified example of the location registration system 10 in accordance with this embodiment will now be explained. This modified example is configured such that, in the location registration system 10 in accordance with the above-mentioned embodiment, the location registration period determination section 18 further determines an administrative time for location registration of a mobile communication terminal 12 according to the number of stays of the mobile communication terminal 12 stored in the location information administration table 16a of the storage section 16, and the location registration control section 20 carries out location registration of the mobile communication terminal 12 within a range of the administrative time determined by the location registration period determination section 18.

Figure 6:
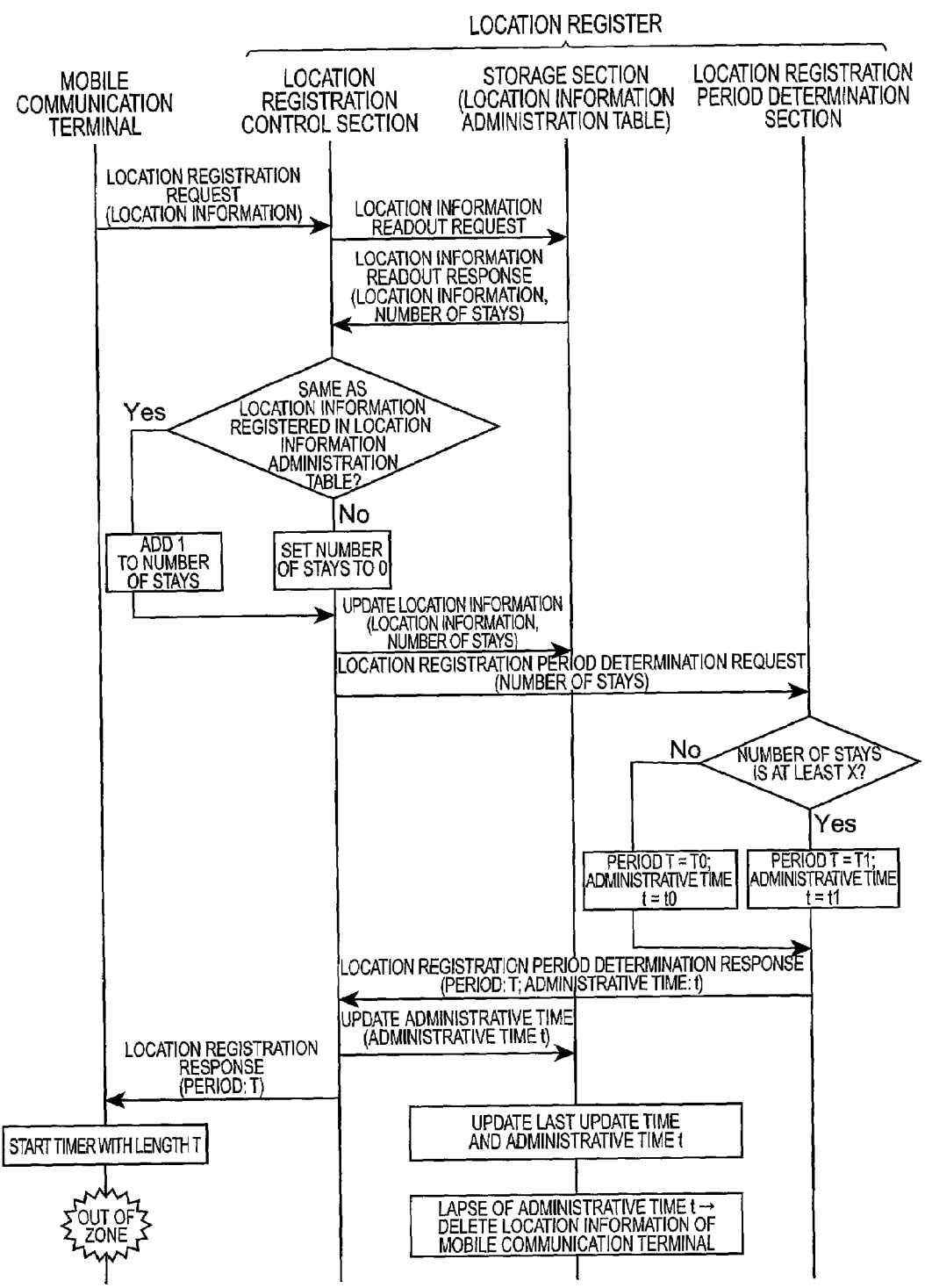
FIG. 6 is a chart showing a procedure of location registration in the location registration system.

FIG. 6 is a chart showing the procedure for carrying out location registration of the mobile communication terminal 12 in this modified example. Operations of this modified example are the same as those of the location registration system 10 in accordance with the above-mentioned embodiment in that the location registration period determination section 18 determines a period of location registration according to the number of stays of the mobile communication terminal 12, and the location registration control section 20 carries out location registration of the mobile communication terminal 12 in response to this period. In this modified example, however, not only the period of location registration is determined by the location registration period determination section 18 according to the number of stays of the mobile communication terminal 12, but also an administrative time for location registration of the mobile communication terminal 12 is determined according to the number of stays of the mobile communication terminal 12 stored in the location information administration table 16a of the storage section 16. More specifically, if the number of stays of the mobile communication terminal 12 is less than a predetermined number (e.g., 10), i.e., the mobile communication terminal 12 does not stay in the same location registration area for at least a predetermined time, then the location registration period of the mobile communication terminal 12 is determined to be a normal location registration period (e.g., 60 minutes), whereas the administrative time for location registration of the mobile communication terminal 12 is determined to be a time (e.g., 70 minutes) longer than the location registration period. If the number of stays of the mobile communication terminal 12 is at least a predetermined number (e.g., 10), i.e., the mobile communication terminal 12 stays in the same location registration area for at least a predetermined time, then the location registration period of the mobile communication terminal 12 is determined to be a predetermined period (e.g., 120 minutes) longer than the above-mentioned normal location registration period, whereas the administrative time for location registration of the mobile communication terminal 12 is determined to be a time (e.g., 130 minutes) longer than the location registration period.

The administrative time determined by the location registration period determination section 18 is outputted to the location registration control section 20 as being included in the location registration period determination response.

Thereafter, the administrative time is outputted to the storage section 16, and is stored into the storage section 16 as a location information administration table 16c such as one shown in FIG. 7 together with the time (last update time) at which the location registration was finally carried out.

If there is no location registration request from the mobile communication terminal 12 even after a lapse of the administrative time from the last update time, then it is determined that the mobile communication terminal 12 has moved to the outside of the zone or its power is turned off, whereby the location registration control section 20 ends administering location information (so that no operations for causing the mobile communication terminal 12 to receive incoming calls will be carried out thereafter).

When an administrative time for location registration of a mobile communication terminal 12 is determined according to the number of stays of the mobile communication terminal 12 as mentioned above, an appropriate administrative time can be set in response to the period of location registration determined according to the number of stays of the mobile communication terminal 12.

This modified example may be configured such that, in conformity to a mode in which a period of location registration of a mobile communication terminal 12 is determined according to the frequency of incoming call to the mobile communication terminal 12, the location registration period determination section 18 further determines an administrative time for location registration of the mobile communication terminal 12 according to the frequency of incoming call to the mobile communication terminal 12 stored in the location information administration table 16b of the storage section 16, and the location registration control section 20 carries out location registration of the mobile communication terminal 12 within a range of the administrative time determined by the location registration period determination section 18.

Also, this modified example may be configured such that, in conformity to a mode in which a period of location registration of a mobile communication terminal 12 is determined according to both of the number of stays of the mobile communication terminal 12 and the frequency of incoming call to the mobile communication terminal 12, the location registration period determination section 18 further determines an administrative time for location registration of the mobile communication terminal 12 according to both of the number of stays of the mobile communication terminal 12 and frequency of incoming call to the mobile communication terminal 12 stored in the location information administration table of the storage section 16, and the location registration control section 20 carries out location registration of the mobile communication terminal 12 within a range of the administrative time determined by the location registration period determination section 18.

Figure 8:
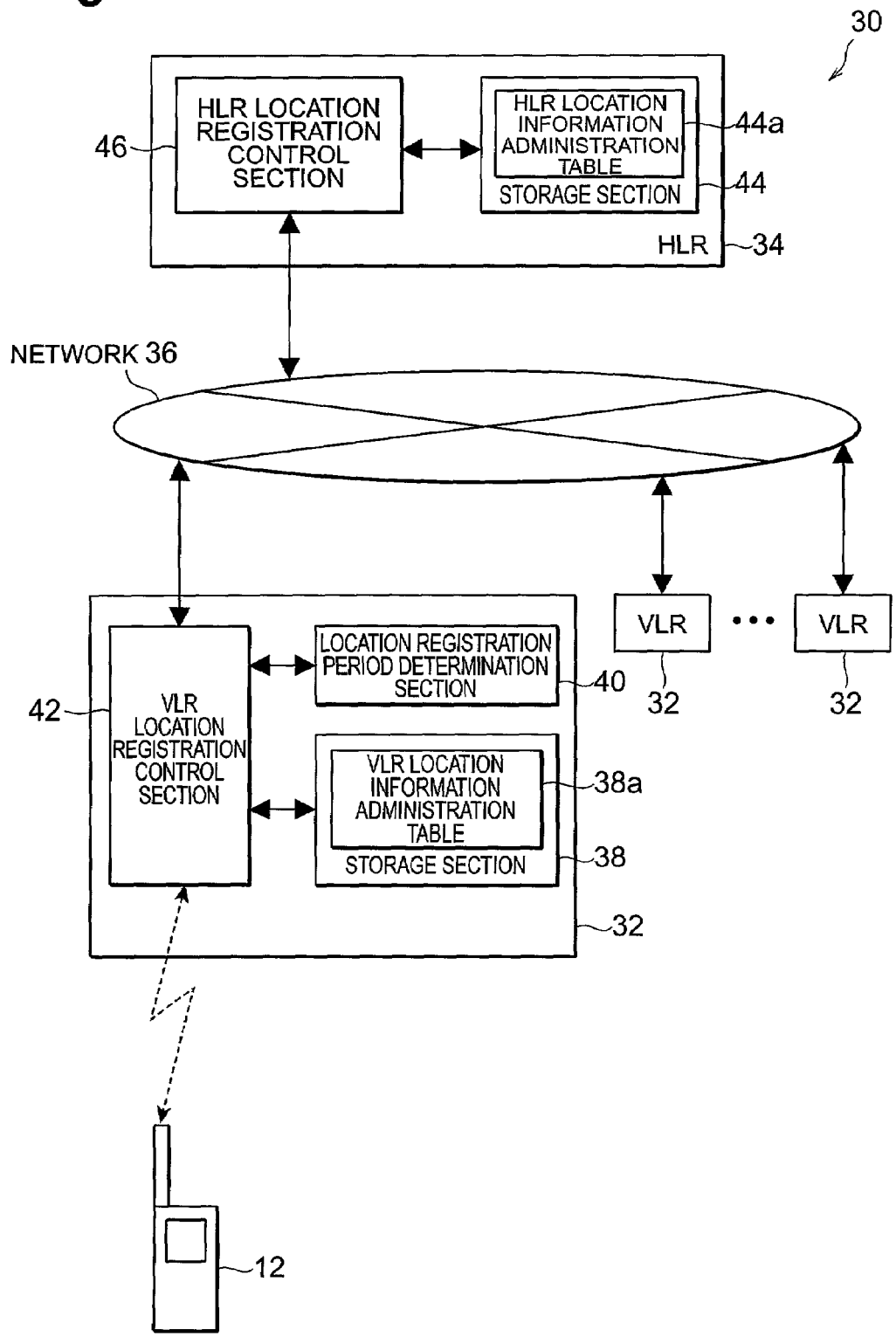
FIG. 8 is a diagram of a location registration system.

A location registration system in accordance with a second embodiment of the present invention will now be explained with reference to drawings. To begin with, the configuration of the location registration system in accordance with this embodiment will be explained. FIG. 8 is a diagram showing the location registration system 30 in accordance with this embodiment. As shown in FIG. 8, the location registration system 30 in accordance with this embodiment comprises a mobile communication terminal 12, a plurality of visitor location registers (hereinafter referred to as VLRs 32) for carrying out location registration of the mobile communication terminal 12 existing in their respective administrative zones (administrative areas) administered thereby, and a home location register (hereinafter referred to as HLR 34) for administering location information of the mobile communication terminal 12 moving across the respective administrative zones of the plurality of VLRs 32. Here, the plurality of VLRs 32 and the HLR 34 are connected to each other by way of a network 36.

Each of the plurality of VLRs 32 comprises a storage section 38, a location registration period determination section 40, and a VLR location registration control section 42. On the other hand, the HLR 34 comprises a storage section 44 and an HLR location registration control section 46. The individual constituents will now be explained in detail.

A VLR location information administration table 38a is stored in the storage section 38 of the VLR 32. FIG. 9 is a chart showing the VLR location information administration table 38a. As shown in FIG. 9, the VLR location information administration table 38a contains respective IDs of a plurality of mobile communication terminals 12 administered by the VLRs 32, respective location information items of the plurality of mobile communication terminals 12, and respective numbers of stays of the plurality of mobile communication terminals 12. For mobile communication terminals 12 which do not exist in the administrative zone of the VLR 32, the location information is defined as "vacant" whereas its number of stays is null.

The location registration period determination section 40 of the VLR 32 determines a period of location registration of the mobile communication terminal 12 according to the number of stays of the mobile communication terminal 12 stored in the location information administration table 38a of the storage section 38. More specifically, for example, when a particular mobile communication terminal 12 stays in the same location registration area by at least a predetermined number of times (e.g., 10) in the case where the location registration of mobile communication terminals 12 is carried out by the location registration control section 42 at a predetermined period (e.g., 60 minutes), the period of location registration for this particular mobile communication terminal 12 is changed to a period (e.g., 120 minutes) longer than the predetermined period.

The VLR location registration control section 42 of the VLR 32 transmits the period of location registration determined by the location registration period determination section 40 to the above-mentioned particular mobile communication terminal 12, receives the location information of the mobile communication terminal 12 transmitted therefrom in response to the transmitted period of location registration, and carries out location registration of the mobile communication terminal 12 according to the received location information. Namely, when registering respective locations of a plurality of mobile communication terminals 12, the location registration control section 42 carries out location registration at different periods corresponding to the respective numbers of stays of the plurality of mobile communication terminals 12.

An HLR location information administration table 44a is stored in the storage section 44 of the HLR 34. FIG. 10 is a chart showing the HLR location information administration table 44a. As shown in FIG. 10, the HLR location information administration table 44a contains respective IDs of a plurality of mobile communication terminals 12, and information concerning which VLR 32 of a plurality of VLRs 32 administers a plurality of mobile communication terminals 12, i.e., in which VLR 32's administrative zone of the plurality of VLRs 32 the plurality of mobile communication terminals 12 exist.

The HLR location registration control section 46 of the HLR 34 administers which VLR 32 carries out location registration of a mobile communication terminal 12 moving across respective administrative zones of a plurality of VLRs 32.

Figure 11:
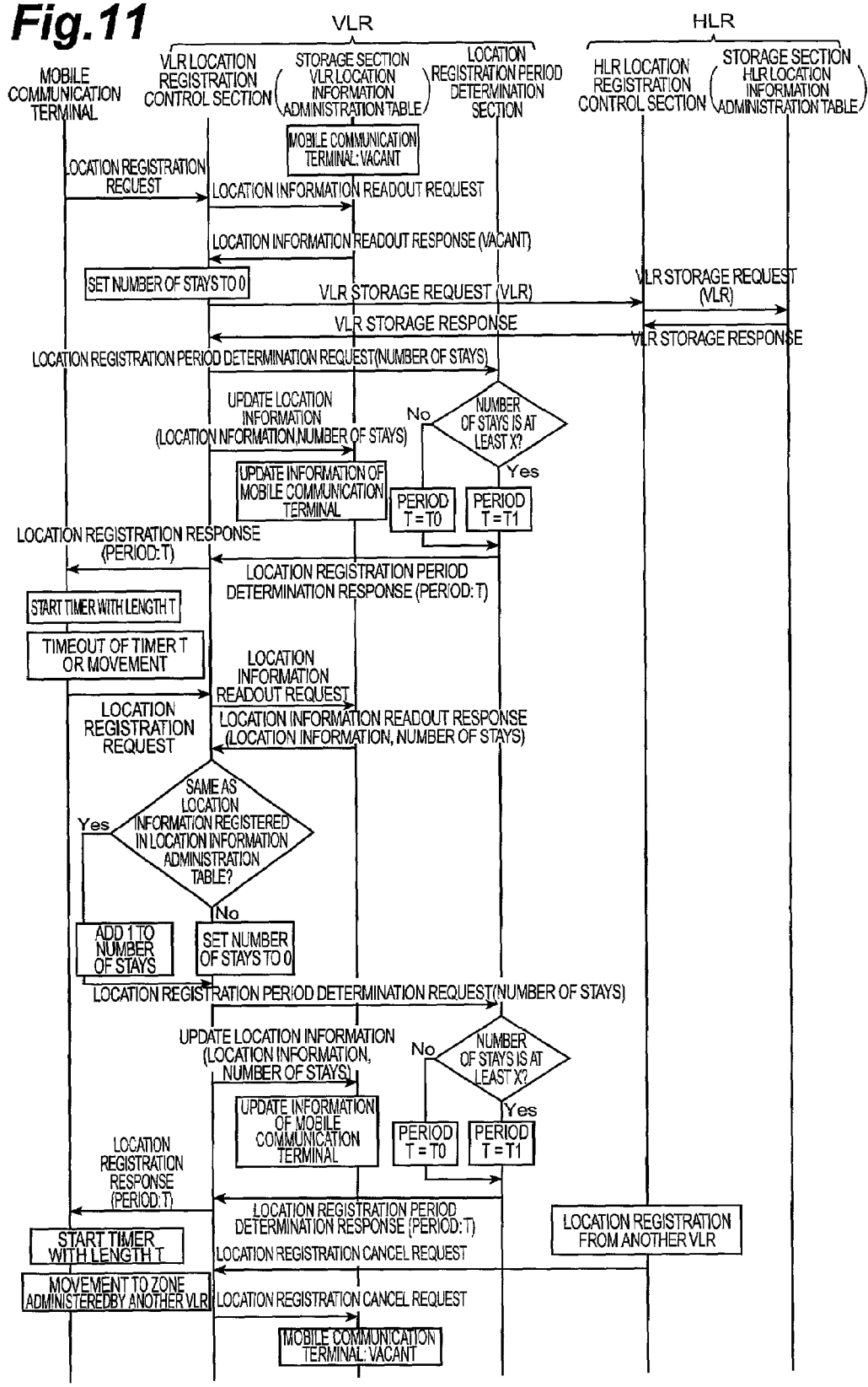
FIG. 11 is a chart showing a procedure of location registration in the location registration system.

Operations of the location registration system in accordance with this embodiment will now be explained. FIG. 11 is a chart showing the process of carrying out location registration of a mobile communication terminal 12 in the location registration system 30 in accordance with this embodiment.

First, a case where the mobile communication terminal 12 enters the administrative zone of a particular VLR 32 from that of another VLR 32 will be considered. Here, before the mobile communication terminal 12 enters the administrative zone of the particular VLR 32, the location information of the mobile communication terminal 12 in the location information administration table 38a of the storage section 38 in this VLR 32 is "vacant" whereas its number of stays is null.

If the mobile communication terminal 12 transmits a location registration request including location information of the mobile communication terminal 12 to the VLR location registration control section 42 of the VLR 32 in the state mentioned above, a location information readout request for reading out the location information and number of stays of the mobile communication terminal 12 is outputted from the VLR location registration control section 42 to the storage section 38.

In response to such a location information readout request, the storage section 38 outputs a location information readout response to the VLR location registration control section 42. Here, the location information readout response includes the location information (i.e., the location information at the time of previous location registration="vacant") of the mobile communication terminal 12 read out from the location information administration table 38a. Since the number of stays in the location information administration table 38a is null at present, the number of stays is not outputted.

When "vacant" is obtained as location information, the VLR location registration control section 42 sets the number of stays of the mobile communication terminal 12 to zero.

Thereafter, a VLR storage request for notifying that the mobile communication terminal 12 enters the administrative zone of the VLR 32 is transmitted from the VLR location registration control section 42 to the HLR location registration control section 46 of the HLR 34. When the VLR storage request is received by the HLR location registration control section 46 of the HLR 34, this VLR storage request is outputted to the storage section 44, whereby the column of visited VLR in the HLR location information administration table 44a of the storage section 44 is updated for this mobile communication terminal 12.

When the updating of the column of visited VLR in the HLR location information administration table 44a is completed, a VLR storage response is outputted from the storage section 44 to the HLR location registration control section 46, and this VLR storage response is transmitted to the location registration control section 42 of the VLR 32 having the zone in which the mobile communication terminal 12 exists.

When the VLR location registration control section 42 of the VLR 32 sets the number of stays of the mobile communication terminal 12 to zero, this number of stays is stored into the location information administration table 38a of the storage section 38, and the location information of the location information administration table 38a of the storage section 38 is updated to the location information received from the mobile communication terminal 12.

Also, when the VLR location registration control section 42 of the VLR 32 sets the number of stays of the mobile communication terminal 12 to zero, a location registration period determination request is outputted from the VLR location registration control section 42 to the location registration period determination section 40. Here, the location registration period determination request includes the number of stays (=0) of the mobile communication terminal 12 set by the location registration control section 20.

When the location registration period determination request is outputted from the VLR location registration control section 42, the location registration period determination section 40 determines a location registration period of the mobile communication terminal 12. More specifically, if the number of stays of the mobile communication terminal 12 is less than a predetermined number (e.g., 10), i.e., the mobile communication terminal 12 does not stay in the same location registration area for at least a predetermined time, then the location registration period of the mobile communication terminal 12 is determined to be a normal location registration period (e.g., 60 minutes). If the number of stays of the mobile communication terminal 12 is at least a predetermined number (e.g., 10), i.e., the mobile communication terminal 12 stays in the same location registration area for at least a predetermined time, by contrast, then the location registration period of the mobile communication terminal 12 is determined to be a predetermined period (e.g., 120 minutes) longer than the predetermined period. In this case, since the number of stays of the mobile communication terminal 12 is zero, the location registration period of the mobile communication terminal 12 is determined to be the normal location registration period (e.g., 60 minutes).

When a location registration period of the mobile communication terminal 12 is determined by the location registration period determination section 40, the location registration period is outputted as a location registration period determination response from the location registration period determination section 40 to the VLR location registration control section 42. Also, the location registration period is transmitted from the VLR location registration control section 42 to the mobile communication terminal 12 as a location registration response. When the mobile communication terminal 12 exists in the administrative zone of the VLR 32, the subsequent procedure of location registration of the mobile communication terminal 12 carried out by the VLR 32 is the same as the procedure of location registration of the mobile communication terminal 12 performed by the location register 14 in the location registration system 10 in accordance with the first embodiment.

If the mobile communication terminal 12 moves to the administrative zone of another VLR 32, and a VLR storage request is transmitted from the VLR location registration control section 42 of this VLR 32 to the HLR location registration control section 46 of the HLR 34, on the other hand, then a location registration cancel request for terminating the location registration is transmitted from the HLR location registration control section 46 of the HLR 34 to the VLR location registration control section 42 of the VLR 32 having the administrative zone where the mobile communication terminal 12 has existed up to the present. When the location registration cancel request is received by the VLR location registration control section 42, it is outputted to the storage section 38, and the location information of the corresponding mobile communication terminal 12 in the VLR location information administration table 38a of the storage section 38 is updated to "vacant."

A modified example similar to that considered in the location registration system 10 in accordance with the first embodiment may be considered in the location registration system 30 in accordance with this embodiment as well. Namely, though a period of location registration of the mobile communication terminal 12 is determined according to the number of stays of the mobile communication terminal 12, and the location registration control section 20 carries out location registration of the mobile communication terminal 12 in response to the location registration period determined according to the number of stays as mentioned above in the location registration system 30 in accordance with this embodiment, it may be configured such that, as shown in FIG. 12, a location information administration table 38b including the frequency of incoming call to the mobile communication terminal 12 is stored in the storage section 38 of the VLR 32, the location registration period determination section 40 determines a period of location registration of the mobile communication terminal 12 according to the frequency of incoming call to the mobile communication terminal 12, and the VLR location registration control section 42 carries out location registration of the mobile communication terminal 12 in response to the location registration period determined according to the frequency of incoming call as mentioned above. In this case, unlike the number of stays, the frequency of incoming call cannot be calculated for each of the plurality of VLRs 32. Therefore, it is necessary that an HLR location information administration table 44b, which includes the frequency of incoming call that is independent of visited VLRs as shown in FIG. 13, be stored in the storage section 44 of the HLR 34 in this case.

Figure 14:
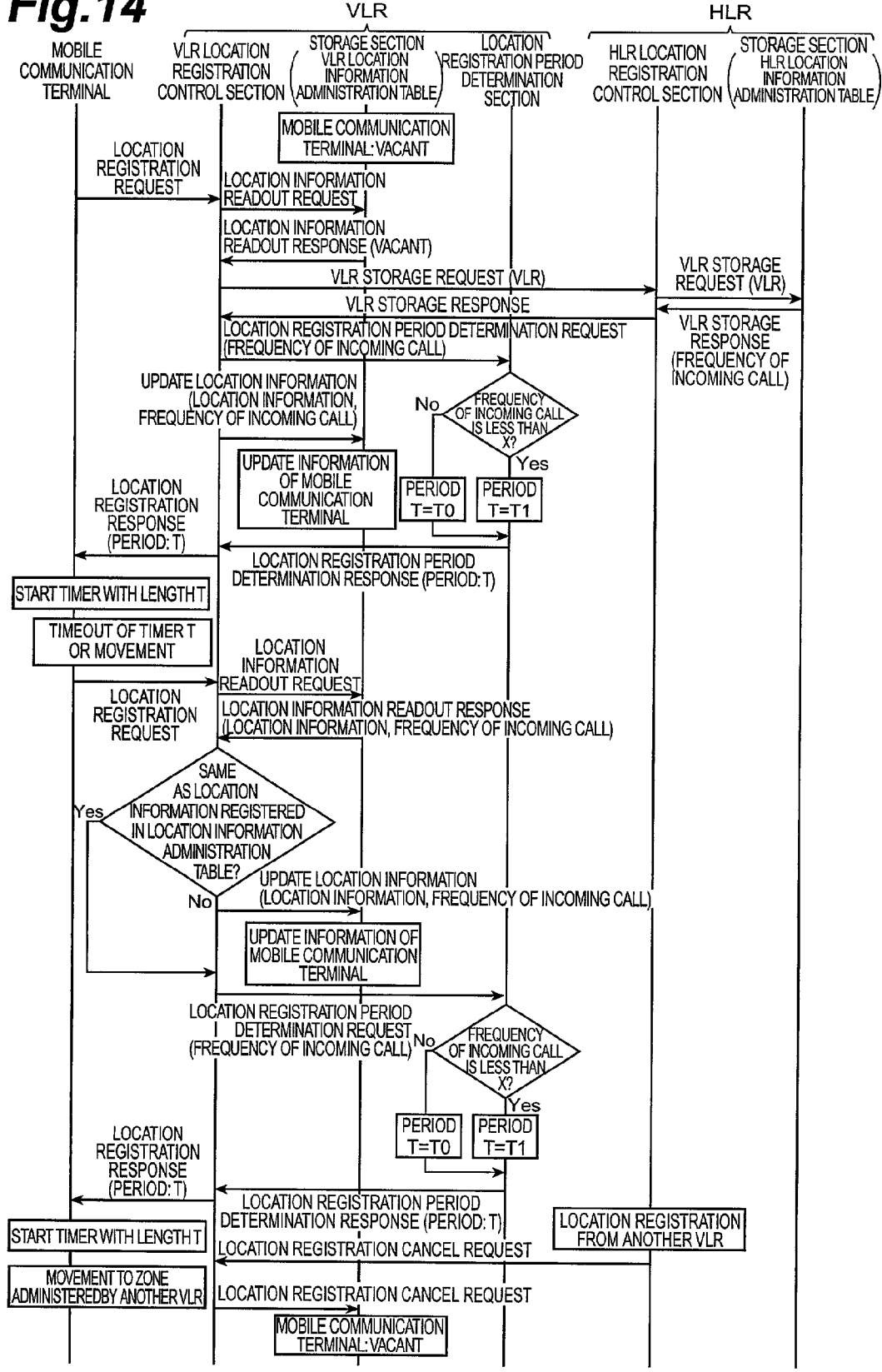
FIG. 14 is a chart showing a procedure of location registration in the location registration system.

FIG. 14 is a chart showing the procedure of carrying out location registration of a mobile communication terminal 12 in this modified example. First, if a location registration request including location information of the mobile communication terminal 12 is transmitted from the mobile communication terminal 12 to the VLR location registration control section 42 of a particular VLR 32 in the state where the mobile communication terminal 12 enters the administrative zone of this particular VLR 32 from the administrative zone of another VLR 32, then a location information readout request for reading out location information of the mobile communication terminal 12 is outputted from the VLR location registration control section 42 to the storage section 38.

In response to such a location information readout request, the storage section 38 outputs a location information readout response to the VLR location registration control section 42. Here, the location information readout response includes the location information (i.e., the location information at the time of previous location registration="vacant") of the mobile communication terminal 12 read out from the location information administration table 38b. At present, the column of the frequency of incoming call in the location information administration table 38b is null.

When "vacant" is obtained as location information, a VLR storage request for notifying that the mobile communication terminal 12 enters the administrative zone of the VLR 32 is transmitted from the VLR location registration control section 42 to the HLR location registration control section 46 of the HLR 34. When the VLR storage request is received by the HLR location registration control section 46 of the HLR 34, it is outputted to the storage section 44, whereby the column of visited VLR in the HLR location information administration table 44a of the storage section 44 is updated for the mobile communication terminal 12, and the frequency of incoming call to the mobile communication terminal 12 is read out from the HLR location information administration table 44a.

When the updating of the column of visited VLR in the HLR location information administration table 44a is completed, a VLR storage response including the frequency of incoming call to the mobile communication terminal 12 read out as mentioned above is outputted from the storage section 44 to the HLR location registration control section 46, and it is transmitted to the location registration control section 42 of the VLR 32 having the zone where the mobile communication terminal 12 exists.

When the VLR storage response including the frequency of incoming call to the mobile communication terminal 12 is received by the VLR location registration control section 42 of the VLR 32, the frequency of incoming call is stored into the location information administration table 38b of the storage section 38, and the location information of the location information administration table 38b in the storage section 38 is updated to the location information received from the mobile communication terminal 12.

Also, when the VLR storage response including the frequency of incoming call to the mobile communication terminal 12 is received by the VLR location registration control section 42 of the VLR 32, a location registration period determination request is outputted from the VLR location registration control section 42 to the location registration period determination section 40. Here, the location registration period determination request includes the frequency of incoming call to the mobile communication terminal 12 received by the location registration control section 42.

When the location registration period determination request is outputted from the VLR location registration control section 42, a period of location registration of the mobile communication terminal 12 is determined by the location registration period determination section 40. More specifically, if the frequency of incoming call to the mobile communication terminal 12 is at least a predetermined number (e.g., 2 times/hour), then the location registration period of the mobile communication terminal is determined to be a normal location registration period (e.g., 60 minutes) If the frequency of incoming call to the mobile communication terminal 12 is less than a predetermined number (e.g., 2 times/hour), then the location registration period of the mobile communication terminal 12 is determined to be a predetermined period (e.g., 120 minutes) longer than the normal location registration period.

When the location registration period of the mobile communication terminal 12 is determined by the location registration period determination section 40, this location registration period is outputted from the location registration determination section 40 to the VLR location registration control section 42 as a location registration period determination response. Also, the location registration period is transmitted from the VLR location registration control section 42 to the mobile communication terminal 12 as a location registration response. When the mobile communication terminal 12 exists in the administrative zone of the VLR 32, the subsequent procedure of location registration of the mobile communication terminal 12 carried out by the VLR 32 is the same as the procedure of location registration of the mobile communication terminal 12 performed by the location register 14 in the first modified example of the location registration system 10 in accordance with the first embodiment.

On the other hand, operations in the case where the mobile communication terminal 12 moves to the administrative zone of another VLR 32 is the same as those in the location registration system 30 in accordance with the second embodiment.

Though the location registration period determination section 40 of the VLR 32 determines a period of location registration of a mobile communication terminal 12 according to the number of stays of the mobile communication terminal 12 or the frequency of incoming call to the mobile communication terminal 12, and the VLR location registration control section 42 carries out location registration of the mobile communication terminal 12 in response to the location registration period determined according to the number of stays of the mobile communication terminal 12 or the frequency of incoming call to the mobile communication terminal 12 in the location information administration system 30 in accordance with this embodiment and the modified example mentioned above, the system may be configured such that location registration period determination section 40 of the VLR 32 determines a period of location registration of a mobile communication terminal 12 according to both of the number of stays of the mobile communication terminal 12 and the frequency of incoming call to the mobile communication terminal 12, and the VLR location registration control section 42 carries out location registration of the mobile communication terminal 12 in response to the location registration period determined according to both of the number of stays of the mobile communication terminal 12 and the frequency of incoming call to the mobile communication terminal 12.

Figure 15:
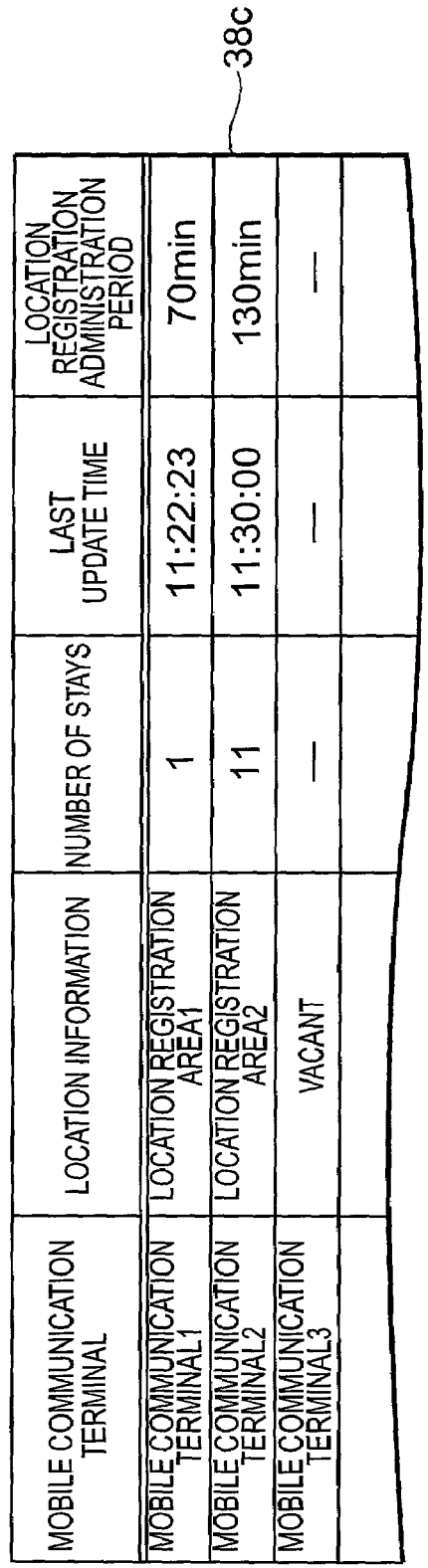
FIG. 15 is a chart of a VLR location information administration table.
Figure 16:
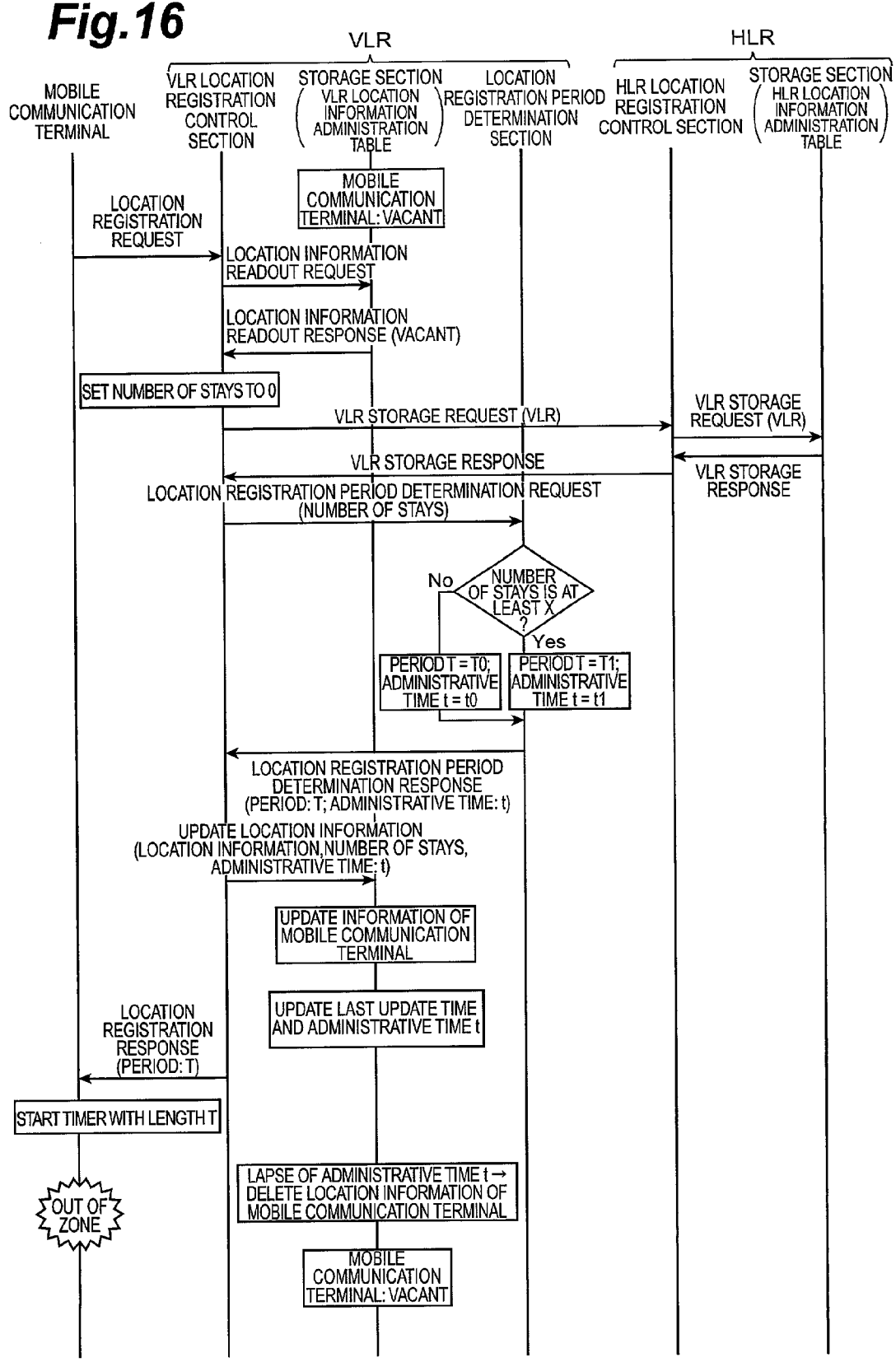
FIG. 16 is a chart showing a procedure of location registration in the location registration system.

Also, a modification corresponding to the second modified example in the location registration system 10 in accordance with the first embodiment can be effected in the location registration system 30 in accordance with this embodiment. In this case, a VLR location information administration table 38c such as the one shown in FIG. 15 is stored in the storage section 38 of the VLR 32, and location registration of a mobile communication terminal 12 is carried out according to the procedure shown in FIG. 16. The specific procedure of location registration in this case is the same as the procedure of location registration in the location registration system 30 in accordance with the second embodiment, and the procedure of determining an administrative time and administering location registration according to the administrative time is the same as the procedure of determining an administrative time and administering location registration according to the administrative time in the second modified example of the location registration system 10 in accordance with the first embodiment.

Such a modified example may be configured in conformity to a mode in which a period of location registration of a mobile communication terminal 12 is determined according to the frequency of incoming call to the mobile communication terminal 12 such that the location registration period determination section 40 further determines an administrative time for location registration of the mobile communication terminal 12 according to the frequency of incoming call to the mobile communication terminal 12 stored in the location information administration table 38b of the storage section 38, and the VLR location registration control section 42 carries out location registration of the mobile communication terminal 12 within a range of the administrative time determined by the location registration period determination section 40.

Also, such a modified example may be configured in conformity to a mode in which a period of location registration of a mobile communication terminal 12 is determined according to both of the number of stays of the mobile communication terminal and the frequency of incoming call to the mobile communication terminal 12, the location registration period determination section 40 further determines an administrative time for location registration of the mobile communication terminal 12 according to both of the number of stays of the mobile communication terminal 12 and frequency of incoming call to the mobile communication terminal 12 stored in the location information administration table of the storage section 38, and the VLR location registration control section 42 carries out location registration of the mobile communication terminal 12 within a range of the administrative time determined by the location registration period determination section 40.

Though the period of location registration of a mobile communication terminal 12 is set to one of two periods according to the number of stays of the mobile communication terminal 12, the frequency of incoming call to the mobile communication terminal 12, or both of the number of stays of the mobile communication terminal 12 and the frequency of incoming call to the mobile communication terminal 12 in the first and second embodiments and their modified examples, it may be set to one of three, four, or more periods. Also, the period of location registration of the mobile communication terminal 12 may be changed continuously. This makes it possible to set the period of location registration more finely.

Similarly, though the administrative time for location registration of a mobile communication terminal 12 is set to one of two times according to the number of stays of the mobile communication terminal 12, the frequency of incoming call to the mobile communication terminal 12, or both of the number of stays of the mobile communication terminal 12 and the frequency of incoming call to the mobile communication terminal 12 in the first and second embodiments and their modified examples, it may be set to one of three, four, or more times. Also, the administrative time for location registration of the mobile communication terminal 12 may be changed continuously. This makes it possible to set the administrative time more finely.

Though the number of stays of a mobile communication terminal 12 is used as information concerning the movement status of mobile communication terminal, and a period of location registration of the mobile communication terminal 12 is set according to the number of stays of the mobile communication terminal 12 in the first and second embodiments, the period of location registration of the mobile communication terminal 12 may be set according to other information items concerning the movement status of mobile communication terminal.

Figure 17:
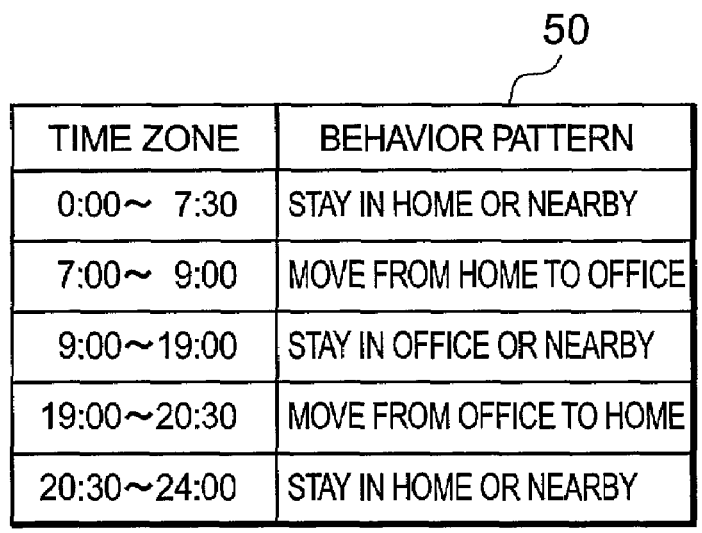
FIG. 17 is a chart of a behavior pattern table.

For example, a period of location registration of a mobile communication terminal 12 may be set according to a behavior pattern of the mobile communication terminal 12 (or a behavior pattern of a person carrying the mobile communication terminal 12) as information concerning the movement status of mobile communication terminal. Here, a time zone, the number of stays and moving directions in the time zone, and the like can be considered as the behavior pattern. More specifically, a behavior pattern table 50 indicating the relationship between time zones and respective behavior patterns in the time zones such as the one shown in FIG. 17 is prepared beforehand, and the period of location registration is made longer and shorter in location registration areas where the possibility of the mobile communication terminal 12 existing is higher or lower per time zone, respectively. In the example shown in FIG. 17, the period of location registration in the time zone from 0:00 to 7:30 is made longer when the mobile communication terminal 12 exists in a location registration area in the home or its nearby, and shorter when the mobile communication terminal 12 exists in other location registration areas. Such a behavior pattern table 50 may be generated according to behaviors of the mobile communication terminal 12 in the past and may successively be updated according to behaviors of the mobile communication terminal 12 in the past. Also, the behavior pattern table may be configured so as to distinguish a weekend behavior pattern from a weekday behavior pattern.

Though the number of stays of a mobile communication terminal 12 is used as information concerning the movement status of mobile communication terminal, and an administrative time for location registration of the mobile communication terminal 12 is set according to the number of stays of the mobile communication terminal 12 in the first and second embodiments, the administrative time for location registration of the mobile communication terminal 12 may be set according to other information items concerning the movement status of mobile communication terminal such as the above-mentioned behavior pattern.

What is claimed is:

1. A location register for carrying out location registration of a mobile communication terminal, said location register comprising:

storage means for storing information concerning a number of consecutive stays of said mobile communication terminal in a location;

determination means for determining a period of location registration of said mobile communication terminal according to said number of consecutive stays of said mobile communication terminal stored in said storage means; and registration means for transmitting said period of location registration determined by said determination means to said mobile communication terminal, receiving location information transmitted from said mobile communication terminal in response to transmitting said period of location registration, and carrying out location registration of said mobile communication terminal according to said received location information.

2. A location register according to claim 1, wherein said determination means further determines an administrative time for location registration of said mobile communication terminal according to said information concerning said number of consecutive stays of said mobile communication terminal stored in said storage means; and wherein said registration means carries out location registration of said mobile communication terminal within a range of said administrative time determined by said determination means.

3. A location registration system comprising:
a mobile communication terminal; and
a location register configured to carry out location registration of said mobile communication terminal;
wherein said location register is the location register according to claim 1.

4. A location register for carrying out location registration of a mobile communication terminal, said location register comprising:

storage means for storing information concerning a frequency of arrival of incoming calls to said mobile communication terminal;

determination means for determining a period of location registration of said mobile communication terminal according to said information concerning said frequency of arrival of incoming calls to said mobile communication terminal stored in said storage means; and registration means for transmitting said period of location registration determined by said determination means to said mobile communication terminal, receiving location information transmitted from said mobile communication terminal in response to said transmitted period of location registration, and carrying out location registration of said mobile communication terminal according to said received location information.

5. A location register according to claim 4, wherein said determination means further determines an administrative time for location registration of said mobile communication terminal according to said information concerning said frequency of arrival of incoming calls to said mobile communication terminal stored in said storage means; and
   wherein said registration means carries out location registration of said mobile communication terminal within a range of said administrative time determined by said determination means.

6. A location registration system comprising:
   a mobile communication terminal; and
   a location register for carrying out location registration of said mobile communication terminal;
   wherein said location register is the location register according to claim 4.

7. A location register for carrying out location registration of a mobile communication terminal, said location register comprising:
   storage means for storing information concerning a movement status of said mobile communication terminal and information concerning a frequency of arrival of incoming calls to said mobile communication terminal;
   determination means for determining a period of location registration of said mobile communication terminal according to said information concerning said movement status of said mobile communication terminal and said information concerning said frequency of arrival of incoming calls to said mobile communication terminal stored in said storage means; and
   registration means for transmitting said period of location registration determined by said determination means to said mobile communication terminal, receiving location information transmitted from said mobile communication terminal in response to said transmitted period of location registration, and carrying out location registration of said mobile communication terminal according to said received location information.

8. A location register according to claim 7, wherein said determination means further determines an administrative time for location registration of said mobile communication terminal according to said information concerning said movement status of said mobile communication terminal and said information concerning said frequency of arrival of incoming calls to said mobile communication terminal stored in said storage means; and
   wherein said registration means carries out location registration of said mobile communication terminal within a range of said administrative time determined by said determination means.

9. A location registration system comprising:
   a mobile communication terminal; and
   a location register for carrying out location registration of said mobile communication terminal;
   wherein said location register is the location register according to claim 7.

10. A location registration method for carrying out location registration of a mobile communication terminal, said location registration method comprising:
    a storage step of storing information concerning a number of consecutive stays of said mobile communication terminal in a location into storage means;
    a determination step of determining a period of location registration of said mobile communication terminal according to said number of consecutive stays of said mobile communication terminal stored in said storage step;
    a transmission step of transmitting said period of location registration determined in said determination step to said mobile communication terminal;
    a receiving step of receiving location information of said mobile communication terminal transmitted from said mobile communication terminal in response to said period of location registration transmitted in said transmission step; and
    a registration step of carrying out location registration of said mobile communication terminal according to said location information received in said receiving step.

11. A location registration method according to claim 10, wherein said determination step further determines an administrative time for location registration of said mobile communication terminal according to said information concerning said number of consecutive stays of said mobile communication terminal stored in said storage means; and
    wherein said registration step carries out location registration of said mobile communication terminal within a range of said administrative time determined in said determination step.

12. A location registration method for carrying out location registration of a mobile communication terminal, said location registration method comprising:
    a storage step of storing information concerning a frequency of arrival of incoming calls to said mobile communication terminal into a storage means;
    a determination step of determining a period of location registration of said mobile communication terminal according to said information concerning said frequency of arrival of incoming calls to said mobile communication terminal stored in said storage means in said storage step;
    a transmission step of transmitting said period of location registration determined in said determination step to said mobile communication terminal;
    a receiving step of receiving location information of said mobile communication terminal transmitted from said mobile communication terminal in response to said period of location registration transmitted in said transmission step; and
    a registration step of carrying out location registration of said mobile communication terminal according to said location information received in said receiving step.

13. A location registration method according to claim 12, wherein said determination step further determines an administrative time for location registration of said mobile communication terminal according to said information concerning said frequency of arrival of incoming calls to said mobile communication terminal stored in said storage means; and
    wherein said registration step carries out location registration of said mobile communication terminal within a range of said administrative time determined in said determination step.

14. A location registration method for carrying out location registration of a mobile communication terminal, said location registration method comprising:
    a storage step of storing information concerning a movement status of said mobile communication terminal and information concerning a frequency of arrival of incoming calls to said mobile communication terminal into a storage means;

a determination step of determining a period of location registration of said mobile communication terminal according to said information concerning said movement status of said mobile communication terminal and said information concerning said frequency of arrival of incoming calls to said mobile communication terminal stored in said storage step;

a transmission step of transmitting said period of location registration determined in said determination step to said mobile communication terminal;

a receiving step of receiving location information of said mobile communication terminal transmitted from said mobile communication terminal in response to said period of location registration transmitted in said transmission step; and a registration step of carrying out location registration of said mobile communication terminal according to said location information received in said receiving step.

15. A location registration method according to claim 14, wherein said determination step further determines an administrative time for location registration of said mobile communication terminal according to said information concerning said movement status of said mobile communication terminal and said information concerning said frequency of arrival of incoming calls to said mobile communication terminal stored in said storage means; and wherein said registration step carries out location registration of said mobile communication terminal within a range of said administrative time determined in said determination step.

16. A location resister for carrying out location registration of a mobile communication terminal, said location resister comprising:

a storage means for storing information concerning a movement status of said mobile communication terminal and/or information concerning a frequency of arrival of incoming calls to said mobile communication terminal;

determination means for determining a period of location registration of said mobile communication terminal according to said information stored in said storage means; and registration means for transmitting said period of location registration determined by said determination means to said mobile communication terminal, receiving location information transmitted from said mobile communication terminal in response to said transmitted period of location registration, and carrying out location registration of said mobile communication terminal according to said received location information, wherein said determination means further individually determines an administrative time for location registration of said mobile communication terminal according to said information stored in said storage means for each mobile communication terminal, wherein said administrative time is set longer than said period of location registration, and wherein said registration means carries out location registration of said mobile communication terminal within a range of said administrative time determined by said determination means.

17. A location register according to claim 16, wherein the storage means is adapted for storing information only concerning a frequency of arrival of incoming calls to said mobile communication terminal.

18. A location register according to claim 16, wherein the storage means is adapted for storing information concerning a movement status of said mobile communication terminal and information concerning a frequency of arrival incoming calls to said mobile communication terminal.

19. A location registration system comprising:

a mobile communication terminal; and a location resister for carrying out location registration of said mobile communication terminal wherein said location register is the location register according to claim 16.

20. A location registration method for carrying out location registration of mobile communication terminal, said location registration method comprising:

a storage step of storing information concerning a movement status of said mobile communication terminal and/or information concerning a frequency of arrival of incoming calls to said mobile communication terminal into storage means;

a determination step of determining a period of location registration of said mobile communication terminal according to said information stored in said storage step;

a transmission step of transmitting said period of location registration determined in said determination step to said mobile communication terminal;

a receiving step of receiving location information of said mobile communication terminal transmitted from said mobile communication terminal in response to said period of location registration transmitted in said transmission step;

a registration step of carrying out location registration of said mobile communication terminal according to said location information received in said received step, wherein said determination step further individually determines an administrative time for location registration of said mobile communication terminal according to said information stored in said storage means, for each mobile communication terminal, said administrative time being set longer than said period of location registration; and said registration step carries out location registration of said mobile communication terminal within a range of said administrative time determined in said determination step.

21. A location registration method according to claim 20, with a storage step of storing information only concerning a frequency of arrival of incoming calls to said mobile communication terminal.

22. A location registration method according to claim 20, with a storage means of storing information concerning a movement status of said mobile communication terminal and information concerning a frequency of arrival of incoming calls to said mobile communication terminal.

* * * * *